(12) United States Patent
Sutherland

(10) Patent No.: US 10,662,801 B2
(45) Date of Patent: May 26, 2020

(54) ACTUATOR CONTROL

(71) Applicant: ROLLS-ROYCE plc, London (GB)

(72) Inventor: Roger A Sutherland, Derby (GB)

(73) Assignee: ROLLS-ROYCE plc, London (GB)

(*) Notice: Subject to any disclaimer, the term of this patent is extended or adjusted under 35 U.S.C. 154(b) by 630 days.

(21) Appl. No.: 15/218,511

(22) Filed: Jul. 25, 2016

(65) Prior Publication Data
US 2017/0051629 A1 Feb. 23, 2017

(30) Foreign Application Priority Data

Aug. 21, 2015 (GB) .................................. 1514921.4

(51) Int. Cl.
| | | |
|---|---|---|
| *F15B 13/044* | (2006.01) | |
| *F01D 17/10* | (2006.01) | |
| *F16K 31/00* | (2006.01) | |
| *F02C 7/042* | (2006.01) | |
| *F01D 11/24* | (2006.01) | |
| *B64D 33/00* | (2006.01) | |

(Continued)

(52) U.S. Cl.
CPC ........... *F01D 17/105* (2013.01); *B64D 33/00* (2013.01); *F01D 9/041* (2013.01); *F01D 11/24* (2013.01); *F01D 17/16* (2013.01); *F01D 17/20* (2013.01); *F01D 25/12* (2013.01); *F01D 25/24* (2013.01); *F02C 7/042* (2013.01); *F15B 13/044* (2013.01); *F16K 31/004* (2013.01); *F05D 2220/32* (2013.01); *F05D 2260/407* (2013.01); *F05D 2270/62* (2013.01); *F05D 2270/65* (2013.01); *F15B 2211/3057* (2013.01); *F15B 2211/6336* (2013.01); *F15B 2211/6656* (2013.01); *F15B 2211/7052* (2013.01); *F15B 2211/7053* (2013.01)

(58) Field of Classification Search
CPC ............ F15B 13/044; F15B 2211/3057; F15B 2211/6336; F15B 2211/6656; F15B 2211/7052; F15B 2211/7053; F16K 31/004; F01D 17/00; F01D 25/12; F01D 9/06
See application file for complete search history.

(56) References Cited

U.S. PATENT DOCUMENTS 3,680,309 A * 8/1972 Wallace, Jr. .......... F01D 17/162
60/785
3,811,364 A * 5/1974 Harkrader ............... F01D 17/26
91/422

(Continued)

FOREIGN PATENT DOCUMENTS

DE 7913165 U1 10/1988
DE 19547149 A1 6/1997

(Continued)

OTHER PUBLICATIONS

Feb. 22, 2016 Search Report issued in British Patent Application No. 1514921.4.

(Continued)

*Primary Examiner* — Thomas E Lazo
(74) *Attorney, Agent, or Firm* — Oliff PLC

(57) ABSTRACT

An actuation system 100 comprises a fluid supply 130 that is fluidly connected to a position control actuator 110. The output of the position control actuator is determined by the fluid supply. The fluid supply is controlled by a piezoelectric actuator 150.

12 Claims, 3 Drawing Sheets

(51) Int. Cl.
*F01D 9/04* (2006.01)
*F01D 17/16* (2006.01)
*F01D 17/20* (2006.01)
*F01D 25/12* (2006.01)
*F01D 25/24* (2006.01)

(56) References Cited

U.S. PATENT DOCUMENTS

| | | | | | |
|---|---|---|---|---|---|
| 4,628,499 | A | * | 12/1986 | Hammett | F15B 11/048 318/599 |
| 5,354,032 | A | * | 10/1994 | Sims | F16K 31/005 251/129.06 |
| 5,960,695 | A | * | 10/1999 | Aardema | F15B 11/006 137/596.17 |
| 6,045,091 | A | * | 4/2000 | Baudu | B64D 29/06 239/265.25 |
| 6,164,621 | A | * | 12/2000 | Bouchard | F16K 31/006 251/129.06 |
| 6,230,606 | B1 | * | 5/2001 | Sato | F15B 11/044 251/129.06 |
| 7,069,728 | B2 | * | 7/2006 | Bruno | F01D 17/10 415/145 |
| 7,343,845 | B2 | * | 3/2008 | Wirtl | G05D 16/163 91/358 R |
| 7,353,743 | B2 | | 4/2008 | Bugel et al. | |
| 8,066,474 | B1 | * | 11/2011 | Jansen | F01D 17/16 251/129.1 |
| 8,297,924 | B2 | * | 10/2012 | Mori | B64C 27/615 416/1 |
| 8,511,058 | B2 | * | 8/2013 | Agrawal | F02C 7/36 60/39.15 |
| 8,615,980 | B2 | * | 12/2013 | Agrawal | F02C 7/36 244/17.11 |
| 2010/0215483 | A1 | * | 8/2010 | Arnett | F01D 17/26 415/151 |
| 2013/0084179 | A1 | * | 4/2013 | Mantese | F01D 17/162 416/1 |
| 2013/0174915 | A1 | * | 7/2013 | Tondolo | G05D 7/0617 137/2 |
| 2013/0276516 | A1 | * | 10/2013 | Tabor | G01M 99/008 73/37 |
| 2014/0133956 | A1 | * | 5/2014 | Bolms | F01D 5/186 415/1 |
| 2015/0101331 | A1 | * | 4/2015 | Goulds | F02C 3/14 60/722 |
| 2015/0330236 | A1 | * | 11/2015 | Beecroft | F02C 6/08 415/144 |
| 2016/0237844 | A1 | * | 8/2016 | Holowczak | F01D 11/04 |
| 2017/0234333 | A1 | * | 8/2017 | Wirtl | F15B 11/006 91/459 |

FOREIGN PATENT DOCUMENTS

| | | |
|---|---|---|
| EP | 0 012 743 A1 | 6/1980 |
| EP | 0012743 A1 * | 6/1980 |
| EP | 0118344 A1 | 9/1984 |
| EP | 0143128 A1 | 6/1985 |
| WO | 2013/160398 A1 | 10/2013 |

OTHER PUBLICATIONS

Jul. 6, 2018 Office Action issued in European Patent Application No. 16181027.0.
Jan. 5, 2017 Search Report issued in European Patent Application No. 16 18 1027.

* cited by examiner

ACTUATOR CONTROL

CROSS-REFERENCE TO RELATED APPLICATIONS

This application is based upon and claims the benefit of priority from British Patent Application Number 1514921.4 filed 21 Aug. 2015, the entire contents of which are incorporated by reference.

BACKGROUND

1. Field of the Disclosure

The present disclosure concerns an actuator. Such an actuator may, for example, be used in the control of systems for a gas turbine engine. Also by way of example, such systems may include variable stator vanes and cooling systems.

2. Description of the Related Art

Modern gas turbine engines comprise various actuation systems for moving and/or adjusting various components and/or systems as required during operation. Many such systems require precise control in order to be most effective. Accordingly, there is a requirement for fully modulating actuation systems.

Conventionally, most actuation systems for fully modulating systems are powered by the supply of high pressure fuel to an actuator under the direct control of a closed loop electronic controller. However, the fuel has limited temperature capability, and must be kept below a temperature of around 140 degrees Celsius. This means that there are parts of the engine where such a system cannot be employed. For example, temperatures in the vicinity of the turbine of a gas turbine engine may considerably exceed this temperature, so actuation systems for turbine case cooling cannot use such a fuel-based arrangement, or at least if such an arrangement is used it would need to be positioned a long way from system being controlled, leading to increased weight, size and complexity and decreased efficiency.

As an alternative high pressure air can be used but such pneumatic systems do not give the level of control required for many systems, and instead are generally only suitable for two-position systems rather than fully modulated systems.

OBJECTS AND SUMMARY

Accordingly, it is desirable to provide an actuation system that is capable of high precision and/or full modulation in high temperature environments.

According to an aspect there is provided an actuation system comprising a fluid supply conduit; a piezoelectric actuator; and a position control actuator. The fluid supply conduit is in fluid communication with the position control actuator, such that the position control actuator can be controlled by the supply of fluid thereto. The piezoelectric actuator is positioned in the fluid supply conduit, such that the flow in the fluid supply conduit can be regulated by the piezoelectric actuator.

According to an aspect, there is provided a method of controlling a position actuator. The method comprises fluidly connecting a fluid supply conduit to the position actuator. The method comprises regulating the flow of fluid provided to the position actuator through the fluid supply conduit using a piezoelectric actuator. This regulation of the flow of fluid may facilitate the control of the position actuator.

According to an aspect (which may be an independent aspect or may be combined with other aspect(s)), there may be provided an actuation system comprising a fluid supply conduit; a piezoelectric actuator; and a position control actuator, in which the fluid supply conduit is in fluid communication with the position control actuator, such that the position control actuator can be controlled by the supply of fluid thereto; and the piezoelectric actuator is positioned in the fluid supply conduit, such that the fluid communicated to the position control actuator may be modulated between relatively high and relatively low pressure fluid (such as air). The relatively low pressure fluid may be atmospheric air. The relatively high pressure fluid may be from the compressor of a gas turbine engine.

Control of the position control actuator may be said to involve controlling the position of the position control actuator and/or the configuration of the position control actuator.

The systems, apparatus and methods provided herein allow precise actuation control. For example, the use of a piezoelectric actuator may allow accurate (for example through rapid, high frequency switching) control of the fluid supplied to the actuator. Such a system and/or method may provide precise actuation regardless of the fluid being used, and thus may be operable in a wide range of environments (for example a wide range of temperatures).

Any one or more of the features described and/or claimed below and/or elsewhere herein may apply to any method or system according to the present disclosure.

An actuator position control system may be provided. Such an actuator position control system may be arranged to control the excitation of the piezoelectric actuator based on the position and/or configuration of the position control actuator, including controlling the excitation based at least in part on the position of the position control actuator. The excitation of the piezoelectric actuator may, in turn, control its position and/or configuration and/or state, and thus also control the flow in the fluid supply conduit.

Such a position control system may comprise a position sensor arranged to sense the position of the position control actuator. Such a position control system may comprise a control unit arranged to receive a signal representative of the sensed position from the position sensor. Such a control unit may send an excitation signal to the piezoelectric actuator based at least in part on the sensed position of the position control actuator.

Any excitation signal to the piezoelectric actuator may also be based on a desired position/state/configuration of the position control actuator. Where a control unit is present, such a control unit may receive a further signal related to the desired position/state/configuration of the position control actuator. Such a further signal may be directly related to the desired position/state/configuration of the position control actuator, or indirectly related, for example relating to a desired position/state/configuration of a system being controlled by the position control actuator.

The piezoelectric actuator may be transformable between a first configuration and second configuration. Transformable may mean, for example, moveable and/or configurable. When the piezoelectric actuator is in the first configuration, fluid in the fluid supply conduit can pass from an upstream (or first) side of the piezoelectric actuator to a downstream (or second) side of the piezoelectric actuator. In the first configuration, the fluid may pass through the fluid conduit without obstruction (or at least without substantial obstruction). In the second configuration fluid in the fluid conduit may be blocked from passing from the upstream (or first) to the downstream (or second) side of the piezoelectric actuator.

Where the piezoelectric actuator is transformable (which may include being moveable) between a first configuration and second configuration, when in the second configuration the fluid conduit may be open at the piezoelectric actuator so as to allow fluid that is in communication with the position control actuator to pass out of the fluid supply conduit. Such a transformation from a first configuration to a second configuration may be based on an excitation signal, for example from a/the position control system.

In the second configuration, the fluid in position control actuator may be in communication with (and/or may be at) lower pressure via the fluid supply conduit, than when in the first configuration. Such lower pressure may be, for example, atmospheric pressure. In the second configuration, the fluid may be said to be vented (for example the fluid from the downstream side of the piezoelectric actuator may be said to be vented), for example vented to atmospheric pressure.

The piezoelectric actuator may be said to modulate (and/or allow modulation) between relatively high and relatively low pressure fluid (such as air). The relatively low pressure fluid may be atmospheric air. The relatively high pressure fluid may be from the compressor of a gas turbine engine.

The position control actuator may take any suitable form. For example, the position control actuator may comprise a piston that is contained and moveable within a chamber. The fluid supply conduit may be fluidly connected to the chamber. The chamber may contain fluid, which may be the same fluid as that in the fluid supply conduit, for example gas, such as air.

In arrangements having a chamber, the chamber may be separated by the piston into an actuator retract chamber (which may be referred to as a first chamber) and an actuator extend chamber (which may be referred to as a second chamber). The fluid supply conduit may be fluidly connected to one of the actuator retract chamber and the actuator extend chamber.

A resilient member (such as a spring of any suitable form) may be provided in the other of the actuator retract chamber and the actuator extend chamber. Such a resilient member may be arranged to act on the piston against the fluid pressure of the fluid supplied by the fluid supply conduit. The position of the piston within the chamber may be controlled by the fluid (for example the pressure of the fluid) supplied by the fluid supply conduit to the chamber.

Additionally or alternatively, in arrangements having a chamber separated by a piston into an actuator retract chamber and an actuator extend chamber, a further fluid supply conduit may be fluidly connected to the other of the actuator retract chamber and the actuator extend chamber. Such a further fluid supply conduit may be provided with a further piezoelectric actuator, such that the flow in the further fluid supply conduit can be regulated (and/or modulated) by the further piezoelectric actuator. The position of the piston within the chamber may be controlled by the fluid (for example the pressure of the fluid) supplied by the fluid supply conduits to their respective chambers.

Accordingly, an actuation system according to the present disclosure may have one, two, or even more than two fluid supply conduits, any one or more of which may be connected to the position control actuator, for example a chamber of a position control actuator. Any features and/or configurations of fluid supply conduits and/or piezoelectric actuators may apply to any one or more (for example all) of the fluid supply conduit(s) and/or piezoelectric actuator(s) of a given arrangement.

Any actuation system described and/or claimed herein may further comprise a high pressure gas supply. The fluid supply conduit (or at least one, for example all, of the fluid supply conduits in arrangements having more than one fluid supply conduit) may be connected to the high pressure gas supply. The piezoelectric actuator may be positioned between the high pressure gas supply and the position control actuator. High pressure gas supply may mean higher than atmospheric (for example local atmospheric) pressure gas supply. Such a high pressure gas supply may be (or may be connected to) a compressor of a gas turbine engine, for example.

The position control actuator may operate to control a system and/or component (including, but not limited to, any system or component described and/or claimed herein) in any suitable manner. Purely by way of example, the position control actuator may be connected to a valve (which may take any suitable form), for example for controlling a separate fluid supply to that of fluid supply conduit. For example, the position control actuator may be used to control a valve that controls gas (such as air) in a pneumatic system, or liquid (such as fuel) in a hydraulic system. Alternatively, the position control actuator may directly control the operation of a component/system, for example though mechanical connection, such as direct mechanical connection, for example though one or more levers and/or hinges.

According to an aspect, there is provided a turbine case cooling system for a gas turbine engine comprising an actuation system as described and/or claimed herein. According to such a system, the position control actuator may be connected to a valve for regulating the flow of cooling fluid to a turbine case.

Such a turbine case cooling system may be part of a tip clearance control system, for example.

According to an aspect, there is provided a variable vane control system for a gas turbine engine comprising an actuation system as described and/or claimed herein. In such an arrangement, the position control actuator may be used to control the position of the variable vanes.

According to an aspect, there is provided a gas turbine engine comprising an actuation system as described and/or claimed herein. For example, such a gas turbine engine may comprise a turbine case cooling system and/or a variable vane control system comprising such an actuation system.

The skilled person will appreciate that except where mutually exclusive, a feature described in relation to any one of the above aspects may be applied to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF EMBODIMENTS

Figure 1:
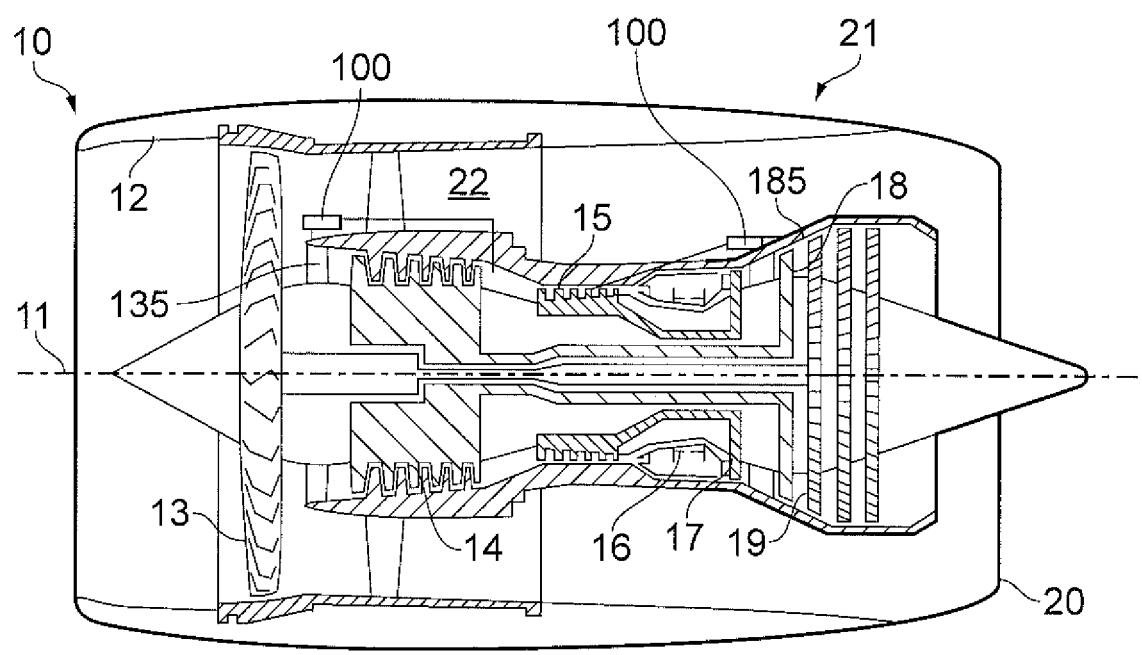
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The gas turbine engine 10 shown in FIG. 1, which is an example of a gas turbine engine 10 in accordance with the present disclosure, comprises an actuation system 100. The actuation system 100 may be used to control a variable stator vane (VSV), such as the variable inlet guide vane (VGV) 135 of the FIG. 1 example. The FIG. 1 arrangement also has an actuation system 100 used to supply cooling fluid to a turbine casing 185, for example as part of a tip clearance control system. Examples of the actuation system 100 are described in more detail in relation to FIGS. 2 to 5.

Figure 2:
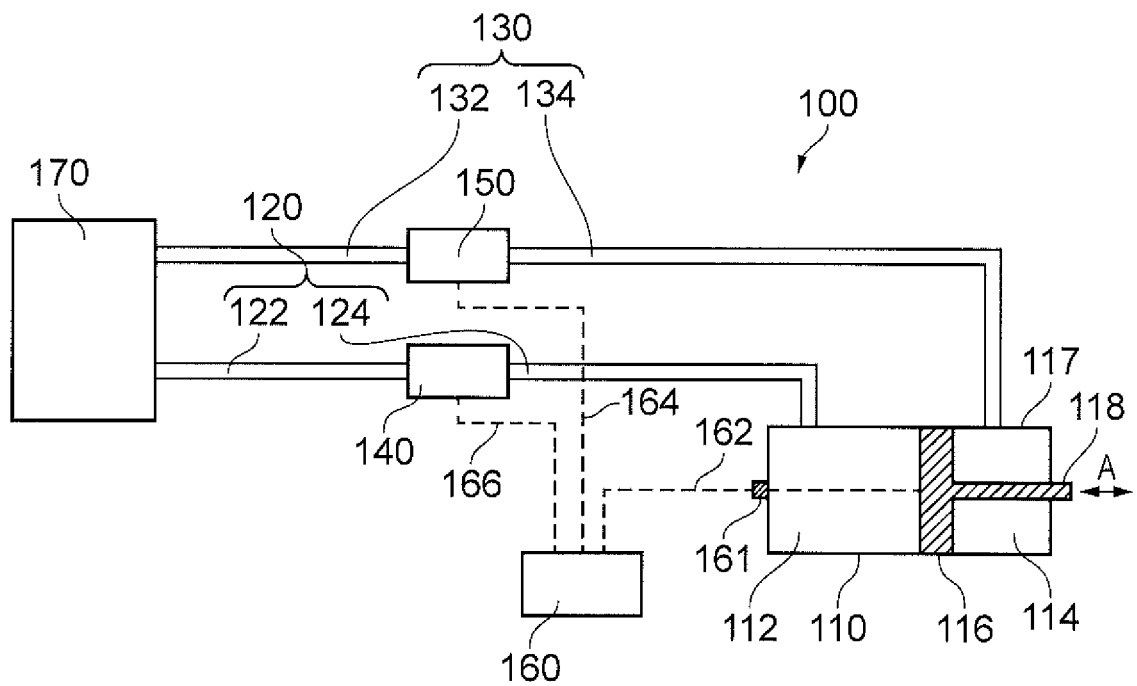
FIG. 2 is an example of an actuation system.

The actuation system 100 of the FIG. 2 example comprises a position control actuator 110. The position control actuator 110 comprises a piston 116. The piston 116 is connected to a position control output element 118, which may be a lever or rod, for example. The output of the position control actuator 110 (which may be, for example, the position of the position control output element 118) may be dependent on the position of the piston 116 within a chamber (which may be a cylinder) 117. In the FIG. 2 example, the movement of the piston 116 within the chamber 117 is shown by arrow A.

The position control element 118 may be used to control any desired component in any desired manner. For example, the position control element 118 may operate a mechanical device to control/move a component directly, or may operate a valve in a separate fluid system to control/move a component indirectly, through the separate fluid system.

The position of the piston 116 may be controlled by the relative force provided to the piston from either side. The relative force may be provided by the relative pressure of a fluid either side of the piston, as in the FIG. 2 example. In the FIG. 2 example, the chamber 117 is separated into a first chamber (or actuator extend chamber) 112 and a second chamber (or actuator retract chamber) 114 by the piston 116. Fluid is supplied to the first chamber 112 by a fluid supply conduit 120. Fluid is supplied to the second chamber 114 by a fluid supply conduit 130.

If the fluid pressure in the first chamber 112 is higher than the fluid pressure in the second chamber 114, then the piston 116 is urged to the right in FIG. 2. Similarly, if the fluid pressure in the second chamber 114 is higher than the fluid pressure in the first chamber 112, then the piston 116 is urged in the opposite direction, to the left in FIG. 2.

The first fluid supply conduit 120 is connected to a high pressure fluid supply 170. The second fluid supply conduit 130 is connected to a high pressure fluid supply 170. The first fluid supply conduit 120 and the second fluid supply conduit 130 may be connected to the same high pressure fluid supply 170, as in the FIG. 2 example. The high pressure fluid supply 170 may be, for example, a fluid supply that is at higher than atmospheric pressure. Purely by way of example, the high pressure fluid supply 170 may be from a compressor section 14, 15 of a gas turbine engine, and thus may be a high pressure gas, such as air, source.

In order to move the piston 116 to the right in FIG. 2, fluid may be supplied to the first chamber 112 from the high pressure fluid supply 170. Additionally or alternatively, the second chamber 114 may be disconnected from the high pressure fluid supply 170, for example by connecting (or venting) the second chamber 114 to a lower pressure than the high pressure supply 170, which may be achieved by venting the second chamber 114 to atmospheric conditions.

Similarly, in order to move the piston 116 to the left in FIG. 2, fluid may be supplied to the second chamber 114 from the high pressure fluid supply 170. Additionally or alternatively, the first chamber 112 may be disconnected from the high pressure fluid supply 170, for example by connecting (or venting) the first chamber 112 to a lower pressure than the high pressure fluid supply 170, which may be achieved by venting the first chamber 112 to atmospheric conditions.

In order to control the fluid supplied by a fluid supply conduit 120, 130 to its respective chamber 112, 114, each of the fluid supply conduits 120, 130 is provided with a respective piezoelectric actuator 140, 150.

Each piezoelectric actuator 140, 150 is connected between the high pressure fluid supply 170 and the respective first or second chamber 112, 114. The first piezoelectric actuator 140 may be said to separate the first fluid supply conduit 120 into an upstream portion 122 (which is between the high pressure fluid supply 170 and the piezoelectric actuator 140) and a downstream portion 124 (which is between the piezoelectric actuator 140 and the first chamber 112). Similarly, the second piezoelectric actuator 150 may be said to separate the second fluid supply conduit 130 into an upstream portion 132 (which is between the high pressure fluid supply 170 and the piezoelectric actuator 150) and a downstream portion 134 (which is between the piezoelectric actuator 140 and the second chamber 114).

Each piezoelectric actuator 140, 150 operates by receiving an excitation signal 164, 166 from a controller 160 (which may be part of an actuator position control system), which may be an engine electronic controller, for example where the actuation system 100 is used as part of a gas turbine engine 10. As explained in more detail elsewhere herein, for example in relation to FIGS. 4 and 5, the each piezoelectric actuator 140, 150 may be transformable between a first configuration and a second configuration. In the first configuration, fluid in the respective fluid supply conduit 120, 130 can pass from an upstream side 122, 132 of the piezoelectric actuator 140, 150 to a downstream side 124, 134 of the piezoelectric actuator 140, 150. Thus, when a piezoelectric actuator 140, 150 is in the first configuration, the high pressure fluid supply 170 is connected to the respective first or second chamber 112, 114. In the second configuration fluid in the respective fluid conduit is blocked from passing from the upstream 122, 132 to the downstream 124, 134 side of the piezoelectric actuator. Thus, when a piezoelectric actuator 140, 150 is in the second configuration, the high pressure fluid supply 170 is not connected to the respective first or second chamber 112, 114.

The controller 160 receives actuator position-signal 162 representative of the position of the position control actuator 110, for example the position of the piston 116 in the chamber 117. The signal 162 may be provided by a position sensor 161, which may be any suitable form, such as may be known to the skilled person, such as (by way of example only) a capacitive, inductive, laser, magnetic, optical or ultrasonic sensor.

In the FIG. 2 example, the excitation signals 164, 166 (which may simply be an electrical current) are provided based at least in part on the actuator position signal 162. Accordingly, the controller 160 may determine a desired direction of movement (if any) of the position control actuator 110 based on the received actuator position signal 162, and then send appropriate excitation signals 164, 166 based on that determination. The controller 160 may also be provided with information relating to a desired position of the position control actuator 110, for example based on a desired position/configuration of a system/component being controlled. The controller 160 may use such information in determining appropriate excitation signals 164, 166.

Figure 3:
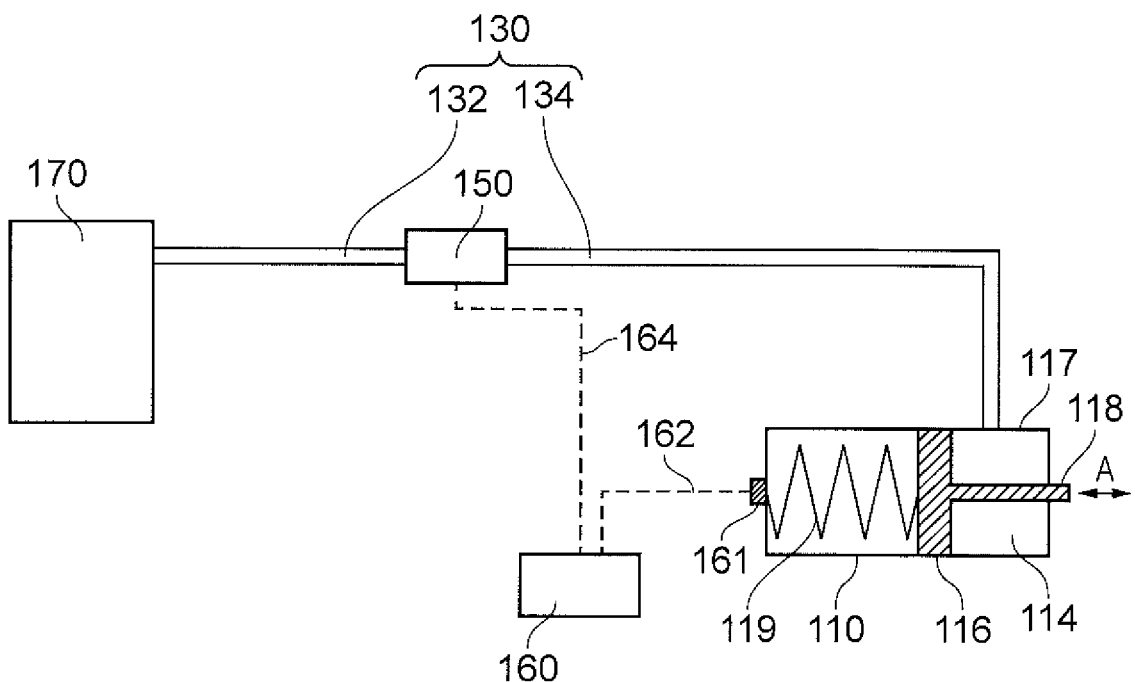
FIG. 3 is an alternative example of an actuation system.

FIG. 3 shows an alternative actuator system 100 in accordance with an example of the present disclosure. The FIG. 3 arrangement shares many features with the FIG. 2 arrangement described in detail above. Like features between FIGS. 2 and 3 are given like reference numerals, and will not be described again in relation to FIG. 3.

A difference between the FIG. 2 and FIG. 3 arrangement is that the first fluid supply conduit 120, together with the associated piezoelectric actuator 140 and connection to the fluid chamber 112, have been removed, and instead a resilient member 119, in the exemplary form of a spring in FIG. 3, is provided on the opposite side of the piston 116 to the second chamber 114.

Accordingly, the position of the piston 116 on the FIG. 3 arrangement is determined by the relative force provided by the resilient member 119 and that provided by the pressure of the fluid in the chamber 114. The excitation signal 164 provided to the piezoelectric actuator 150 may be based at least in part on the known properties of the resilient member 119. The operation of the FIG. 3 arrangement may otherwise be as described above in relation to the FIG. 2 arrangement.

Figure 4:
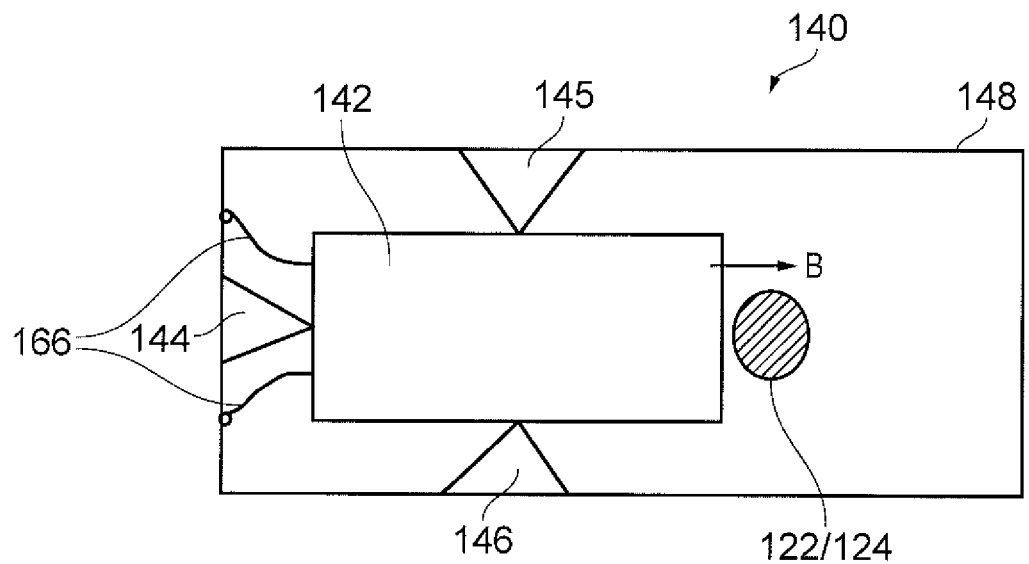
FIG. 4 shows a schematic of a piezoelectric actuator in a first position.
Figure 5:
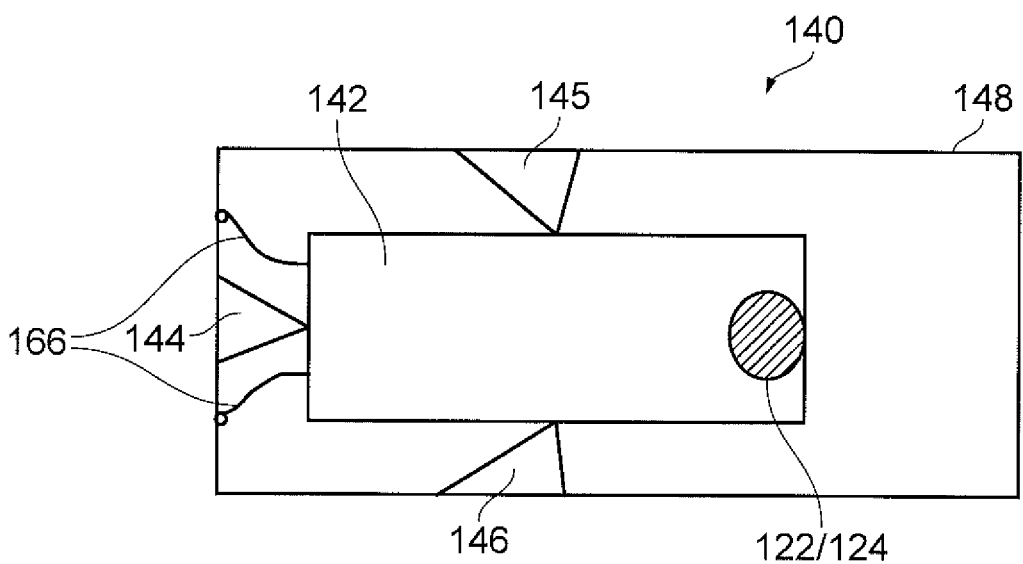
FIG. 5 shows a schematic of a piezoelectric actuator in a second position.

FIGS. 4 and 5 show an example of a piezoelectric actuator 140, 150 in more detail. The piezoelectric actuator shown in FIGS. 4 and 5 is given the reference numeral 140, but it will be appreciated that the piezoelectric actuator 150 shown in FIGS. 2 and 3 may be substantially the same.

FIG. 4 shows the piezoelectric actuator 140 in a first configuration. In the first configuration, the fluid supply conduit 120 may be said to be open, in that the upstream side 122 and the downstream side 124 are in fluid communication. As explained elsewhere herein, in this configuration the high pressure fluid supply 170 is in fluid communication with the respective first or second chamber 112, 114 of the position control actuator 110.

When the excitation signal 166 is changed, the piezoelectric actuator 140 changes from the first configuration shown in FIG. 4 to the second configuration shown in FIG. 5. The change in excitation signal 166 may be, for example, switching on a current or switching off a current.

The different excitation signal 166 causes piezoelectric material 142 to change shape. In the FIG. 4/5 example, the change in shape is an extension of the piezoelectric material 142 towards the right in the Figures, in the direction of arrow B. Purely by way of example, the piezoelectric material 142 may be anchored to one side of a casing 148, at position 144, allowing the material 142 to deform, for example extend, away from the anchor point. Further guide members 145, 146 may be provided in order to guide the movement of the piezoelectric material 142. Of course, a great many other arrangements of piezoelectric actuator 140 may also be suitable, and the one shown in FIGS. 4 and 5 is by way of example only.

In the FIG. 5 configuration, the fluid supply conduit 120 may be said to be closed, in that the upstream side 122 and the downstream side 124 are not in fluid communication. In this configuration the high pressure fluid supply 170 is not in fluid communication with the respective first or second chamber 112, 114 of the position control actuator 110. Optionally, in the second configuration the fluid may vent from the respective chamber 112, 114, for example via a valve and/or fluid exit passage in the piezoelectric actuator 140.

It will be understood that the invention is not limited to the embodiments above-described and various modifications and improvements can be made without departing from the concepts described herein. By way of example, although the actuation system 100 is shown and described in relation to FIG. 1 as part of a gas turbine engine 10, it will be appreciated that the actuation system 100 may be used and/or applied with/to any compatible system and/or component, including but not limited to systems and/or components of gas turbine engines, aircraft, land vehicles, water vehicles or any other static or moveable structures. Except where mutually exclusive, any of the features may be employed separately or in combination with any other features and the disclosure extends to and includes all combinations and sub-combinations of one or more features described herein.

I claim:

1. A gas turbine engine comprising an actuation system, the actuation system comprising:
    a fluid supply conduit;
    a piezoelectric actuator; and
    a position control actuator, wherein:
    the fluid supply conduit is in fluid communication with the position control actuator, such that the position control actuator can be controlled by the supply of fluid thereto,
    the piezoelectric actuator includes piezoelectric material positioned in the fluid supply conduit, such that the flow in the fluid supply conduit can be regulated by the piezoelectric actuator, the piezoelectric material is transformable between a first configuration and second configuration, and when the piezoelectric material is in the first configuration, fluid in the fluid supply conduit can pass from an upstream side of the piezoelectric actuator to a downstream side of the piezoelectric actuator, whereas in the second configuration of the piezoelectric material, fluid is blocked by the piezoelectric material from passing from the upstream side to the downstream side of the piezoelectric actuator.

2. The gas turbine engine according to claim 1, further comprising an actuator position control system arranged to control the excitation of the piezoelectric actuator based on the position of the position control actuator.

3. The gas turbine engine according to claim 2, wherein the actuator position control system comprises:
   a position sensor arranged to sense the position of the position control actuator; and
   a control unit arranged to receive a signal representative of the sensed position from the position sensor, and to send an excitation signal to the piezoelectric actuator based at least in part on the sensed position of the position control actuator.

4. The gas turbine engine according to claim 1, wherein in the second configuration the fluid conduit is open at the piezoelectric actuator so as to allow fluid that is in communication with the position control actuator to pass out of the fluid supply conduit.

5. The gas turbine engine according to claim 1, wherein:
   the position control actuator comprises a piston that is contained and moveable within a chamber; and
   the fluid supply conduit is fluidly connected to the chamber.

6. The gas turbine engine according to claim 5, wherein:
   the chamber is separated by the piston into an actuator retract chamber and an actuator extend chamber;
   the fluid supply conduit is fluidly connected to one of the actuator retract chamber and the actuator extend chamber; and
   a resilient member is provided in the other of the actuator retract chamber and the actuator extend chamber and arranged to act on the piston against the fluid pressure of the fluid supplied by the fluid supply conduit.

7. The gas turbine engine according to claim 5, wherein:
   the chamber is separated by the piston into an actuator retract chamber and an actuator extend chamber;
   the fluid supply conduit is fluidly connected to one of the actuator retract chamber and the actuator extend chamber; and
   a further fluid supply conduit is fluidly connected to the other of the actuator retract chamber and the actuator extend chamber, the further fluid supply conduit being provided with a further piezoelectric actuator, such that the flow in the further fluid supply conduit can be regulated by the further piezoelectric actuator.

8. The gas turbine engine according to claim 1, further comprising a high pressure gas supply, wherein:
   the fluid supply conduit is connected to the high pressure gas supply; and
   the piezoelectric actuator is positioned between the high pressure gas supply and the position control actuator.

9. The gas turbine engine according to claim 8, wherein the high pressure gas supply is a compressor of a gas turbine engine.

10. The gas turbine engine according to claim 1, wherein the position control actuator is connected to a valve for controlling a separate fluid supply to that of fluid supply conduit.

11. The gas turbine engine according to claim 1, further comprising a turbine case cooling system, wherein the position control actuator is connected to a valve for regulating the flow of cooling fluid to a turbine case.

12. The gas turbine engine according to claim 1, further comprising a variable vane control system, wherein the position control actuator is used to control the position of the variable vanes.

* * * * *